United States Patent [19]

Sway et al.

[11] 4,233,323

[45] Nov. 11, 1980

[54] METHOD FOR TENDERIZING AND/OR PASTEURIZING MEAT

[76] Inventors: Boris Sway, 7201 W. Aracoma Dr., Cincinnati, Ohio 45237; Walter C. Reiman, 175 Tamworth Rd., Troy, Ohio 45373

[21] Appl. No.: 958,823

[22] Filed: Nov. 8, 1978

Related U.S. Application Data

[63] Continuation-in-part of Ser. No. 761,482, Jan. 24, 1977, abandoned.

[51] Int. Cl.$^2$ .............................................. A23L 3/28
[52] U.S. Cl. ..................................... 426/55; 426/248; 426/641
[58] Field of Search ................. 426/55, 233, 234, 237, 426/238, 248, 641, 645

[56] References Cited

U.S. PATENT DOCUMENTS

| | | | |
|---|---|---|---|
| 2,169,081 | 8/1939 | James | 426/55 |
| 2,384,203 | 9/1945 | Sperti | 426/232 |
| 2,489,918 | 11/1949 | Menges | 426/248 X |
| 2,650,882 | 9/1953 | Sperti | 426/248 |
| 2,932,573 | 4/1960 | Reiman | 426/248 |

OTHER PUBLICATIONS

"The Tenderization of Meat" Ind. Fellowship on Meat Merchandising, Mellon Inst. Pitt. Pa., 1940, pp. 1-6.

*Primary Examiner*—Robert A. Yoncoskie
*Attorney, Agent, or Firm*—Kinney & Schenk

[57] ABSTRACT

Fresh meat, wrapped and unwrapped, is confined within a chamber which contains means for generating ultraviolet light rays in the range of 2650 to 3000 A°. The outer surface of meat within the chamber is subjected to ultraviolet light for a period of time sufficient to kill most of the bacteria in the outer surfaces of the meat and before discoloration occurs. Enzymatic action within the meat occurs during and after irradiation. After those of the bacteria on the surface of the meat which were not killed during the initial exposure to ultraviolet rays have multiplied to the number originally on the outer surface of the meat, it is again subjected to ultraviolet rays for another period of time during which most of the surface bacteria are killed after which the now tenderized meat is removed from the chamber. The temperature of the meat is not increased beyond the temperature which it attains during its exposure to ultraviolet rays, and re-exposure to said rays occurs at the then attained temperature of the product.

11 Claims, 5 Drawing Figures

U.S. Patent  Nov. 11, 1980  4,233,323
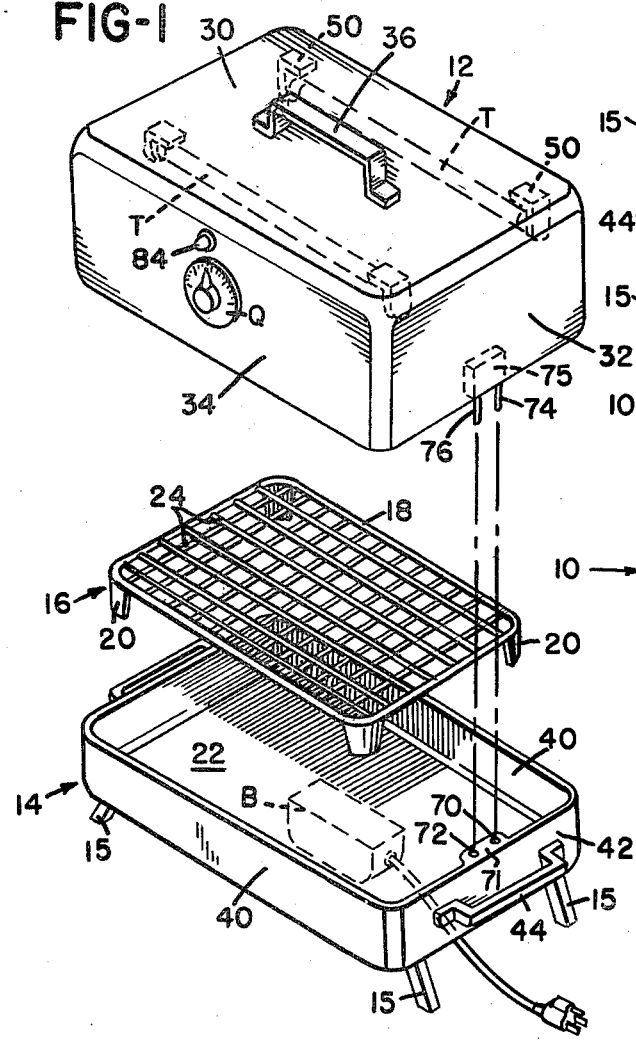
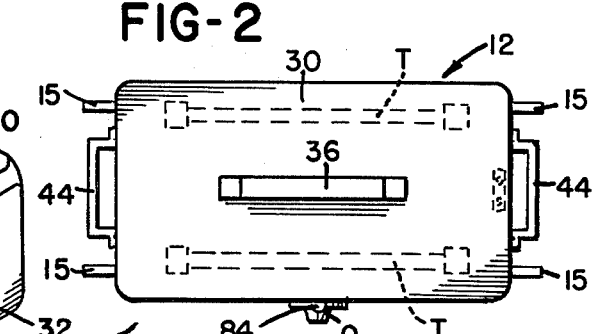
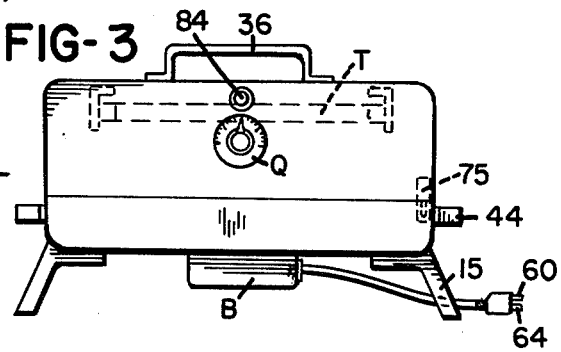
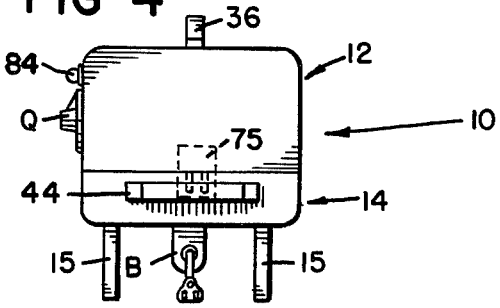
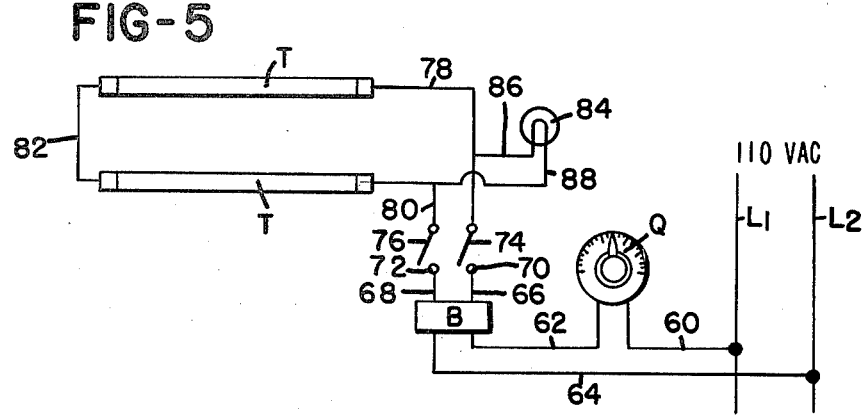

METHOD FOR TENDERIZING AND/OR PASTEURIZING MEAT

This application is a continuation-in-part of Application Ser. No. 761,482, filed Jan. 24, 1977, now abandoned.

BACKGROUND OF THE INVENTION

1. Field of the Invention

The field of the invention relates to method of and apparatus for tenderizing meat, utilizing the enzymatic action of the natural enzymes within the meat, while controlling the surface bacteria by means of intermittent exposure to ultraviolet light.

2. Description of the Prior Art

U.S. Pat. No. 2,650,882 to G. S. Sperti discloses a cyclic process and apparatus for tenderizing meat by subjecting it to irradiation while the meat is maintained at temperatures below 60° F. and preferably well below 45° F. for time intervals sufficient to insure a low surface bacterial count. Sperti notes that:

it is common practice to employ ultraviolet radiation both in pre-chilled chambers and in tenderizing chambers; but inasmuch as intense ultraviolet radiation long continued has a tendency to produce discoloration and sunburn in the meat pieces, it has been the practice to diminish the intensity of the irradiations to a point where discoloration does not occur within the space of time of storage or tenderizing treatments. Under these circumstances, the intensity of the irradiations is not sufficient to control the activity of microorganisms which, under the conditions of temperature well above freezing, and under conditions of moisture hereinafter set forth, multiply rapidly enough to produce sliming, discoloration and odor with a consequently high trimming loss. (Col. 2, lines 25–42)

In Column 3, lines 13, Sperti states:

It has been found that the irradiation of meats at low temperatures is more effective in killing surface microorganisms than at high temperatures, an effect which I believe to be due to the decreased activity and resistance of the microorganisms at low temperatures. Thus, I have found that it is readily possible by treating the surface of meats when the pieces are at low temperatures (comparable to, or only slightly above those of the pre-chill chamber) to use an intensity of ultraviolet light sufficient to produce a high degree of surface sterilization without encountering discoloration. Thus, when the meat pieces have been brought down to temperature in the pre-chill chamber and prior to their removal for tenderizing, I may step up the intensity of irradiation in the prechill chamber for sterilizing*** or I may irradiate the pieces strongly after they have been introduced into the tenderizing chamber but before the temperature has been allowed to rise more than say ten or fifteen degrees above the temperature of the pre-chill chamber. As the temperature of the meat pieces rises, the irradiation is diminished or stopped in order to avoid discoloration.*** Where sterilization is accomplished by ultraviolet radiations, care should be taken with the placement of the light sources or the exposure of the meat pieces to them so as to irradiate all parts of the surface of the meat pieces sufficiently.

Sperti confines the higher intensity radiation to the lower temperature portions of his cycle either using at other times no irradiation at all or only such irradiation as is required to maintain a generally low count of microorganisms in the air of the chamber.

To summarize, this prior art patent teaches that "meat pieces are sterilized by irradiation or otherwise at low temperatures which will be below 60° F. (and preferably well below 45° F. where the meat is irradiated) for time intervals sufficient to insure a low surface bacterial count. Then the ultraviolet light is turned off or dimmed and the temperature of the meat is increased to a higher value, usually between 60° and 90° F."

The humidity of the surrounding air is simultaneously automatically adjusted to values which will ensure substantially no loss of weight by the meat due to evaporation and no condensation on it, not only at the high final temperatures but during the temperature changes aforesaid.

The meat is held at the high temperature during a predetermined interval, whereupon the temperature is again lowered to a value at least as low as 60° F. and preferably as low as well below 45° F. Sterilization or some degree of bacteriological control is again practiced at the lower temperature. Where ultraviolet light is employed, the lights are again turned on or increased in intensity.

The foregoing cycle is repeated as often as necessary to tenderize the meat to the desired degree.

Sperti states that he has achieved very satisfactory results in tenderizing sides and quarters of beef in treatments in which:

they are maintained at high temperatures (around 75° F.) for a period of approximately 10 hours after which they are chilled and maintained at a temperature below 45° for a period of approximately 14 hours. The maintenance of meat at relatively low temperatures, but temperatures at which the enzymatic activity can nevertheless occur, following a period of tenderization at quite high temperatures, appears to be an advantage in itself, while as has already been pointed out, the chilling of the meat pieces after a period of high temperature treatment may be required for resterilization, as well as for preventing a too high rise in temperature of the meat adjacent the bone.

U.S. Pat. No. 2,384,203 to G. Sperti discloses an irradiation process for the treatment of meat during storage and tenderizing wherein the meat to be tenderized is subjected to ultraviolet light only during those periods of time when the meat is at a temperature which does not exceed 45° F.

In this patent Sperti teaches that in order to prevent undue drying and darkening of the meat, it is enclosed in a tight envelope of cellophane, pliofilm, or the like, which is pervious to ultraviolet radiation. The envelope likewise serves to seal the meat against contamination by airborne microorganisms. Means are provided for preventing operation of the ultraviolet lamps whenever the temperature in the storage compartment is above a predetermined 45° F.

Sperti states that the application of relatively brief and relatively high intensity irradiation applied only at lower temperatures, say below 45° F., give better product results both in tenderizing and in storage.

U.S. Pat. No. 2,926,089 to B. E. Williams discloses the method of aging and ripening meat by periodically introducing Thamnidium, a mold strain, into an enclosed space in which sides of beef are housed over a period of 48 hours while the meat temperature is maintained at 70° F. to 75° F. for a period of 32 hours or more after which the meat temperature is reduced to 33° F. to 35° F. Williams periodically sterilizes the atmosphere within the chamber during the cooling period by spraying a compound selected from the group consisting of propylene glycol or tributyl tin oxide into the enclosed space, or wherein sterilization is accomplished during the cooling period by changing the air within the enclosed space by means of electrostatic precipitation.

U.S. Pat. No. 3,377,941 to B. M. Jaremus discloses a domestic refrigerator having a meat aging and tenderizing compartment provided therein in which the meat-tenderizing process as described in U.S. Pat. No. 2,926,089 to B. E. Williams may be practiced on a miniature scale, in a domestic refrigerator, using Thamnidum as an aging "Activator," and subjecting the meat product to ultraviolet rays for the entire 48 hour tenderizing process.

U.S. Pat. No. 2,713,002 to B. E. Williams discloses the method of aging beef by wrapping a freshly killed, skinned carcass in a wrapper which has been soaked in a bactericidal agent. The carcass is housed within the wrapper during the aging process, the wrapper being provided with a plurality of openings to provide a wicking and breathing action which prevents the formation of slime on the carcass. After the wrapped meat has been subjected to an aging process in the presence of ultraviolet radiation it is then transferred to another room where it is chilled while being subjected to additional ultraviolet radiation. This patent states that the:

beneficial effects of ultraviolet radiation so far as the aging of meat is concerned, are due primarily to the maintenance of the atmosphere of the storage room free from bacteria and not to the direct contact of the ultraviolet rays on the surface of the meat. In other words, ultraviolet radiation retards bacterial propagation in the air and inhibits the growth of the airborne microorganisms, but is of little or no value in controlling the development of bacteria already on the surface of the meat. The wrapper described above, not only screens out the rays which would normally deleteriously affect the red meat and fat but in addition effectively controls the development of bacteria already on the surface of the meat . . . " (Col. 3, lines 1–13).

U.S. Pat. No. 3,300,990 of B. M. Jaremus discloses a thermoelectric meat aging/tenderizing apparatus for fresh meat which in the aging process, when cut, is treated with an *aging* accelerator, Thamnidum, after which it is placed in a storage zone where the temperature is maintained between 70° F. and 75° F. and a relative humidity above 90% for approximately 48 hours. During the last nine hours of the processing period the meat is continuously exposed to ultraviolet radiation.

Jaremus also describes a *tenderizing* process wherein fresh meat is maintained between 70° F. and 75° F. for approximately 48 hours while a source of ultraviolet radiation is maintained in continuous operation throughout the entire tenderizing period.

U.S. Pat. No. 2,169,081 to R. F. James discloses a process for ripening and storage of meat by subjecting same to temperatures above 45° F. until internal tenderization has occurred while simultaneously inhibiting surface deterioration by irradiating the meat with ultraviolet light in the range between 2500 and 3000 A.U. during the entire "ripening" and storage periods.

The James patent states that:

direct radiation of the cut surfaces of meat results in some darkening. This effect can be minimized by reducing the intensity of direct radiations and securing the sterilization by air circulation. The incidence of energy upon the cut surface of the meat causes a chemical change within the organic compounds of the meat with the incident formation of a protective coagulum having a pigmentation.

U.S. Pat. No. 2,192,348 to R. F. James discloses the use of ultraviolet rays for sterilizing the air which is introduced into a compartment in which meat is to be tenderized. In one embodiment, means are provided for effecting the direct irradiation of all outer surfaces of the meat to action of ultraviolet rays, during the entire two or three weeks tenderization process.

U.S. Pat. No. 2,489,918 to L. J. Menges discloses a process for tenderizing meat, and in particular beef, by placing the meat in a confined area the temperature of which is maintained at 56° F., with a relative humidity of 80% to 85% and wherein air under a velocity of 50–75' per. min. is circulated around the meat wherein the aforesaid conditions are maintained for a period of about 48 hours during which ultraviolet radiations are provided via one 30" generator for every 20 (twenty) square feet of floor space.

U.S. Pat. No. 2,482,507 to Rentschler discloses a method of destroying microorganisms and, in particular, to a method of sterilizing a fluid host by irradiating the host with bactericidal ultraviolet energy.

U.S. Pat. No. 2,906,104 to H. W. Schaefer discloses apparatus for irradiating the contents of a refrigerated cabinet, utilizing ultraviolet rays which are interrupted by means of a motor-driven rotating shield, said shield producing controlled period of irradiation of substantially equal intensity on successive portions of the refrigerator.

U.S. Pat. No. 2,192,348 to R. F. James discloses apparatus for the treatment and storage of food, including meat products, which are housed within a refrigerated case, wherein ultraviolet rays are continuously generated for inhibiting the growth of bacteria and molds on the surface of meats stored in the refrigerated compartment.

U.S. Pat. No. 2,932,573 to W. C. Reiman, a coinventor of the subject invention, discloses a method for treating meat whereby to accelerate the enzymatic activity within the meat product, by irradiating the meat with ultraviolet radiations.

Reiman teaches the continuous irradiation of the surface of meat with ultraviolet rays during the entire meat-treating period.

From the foregoing it will be noted that ultraviolet rays have been extensively used over the past 36 years for the purpose of inhibiting bacterial growth in meat undergoing tenderization by reason of enzymatic action, wherein the meat has been either continuously subjected to the action of ultraviolet rays, during the entire enzymatic action tenderizing process—or wherein the meat products have been subjected to ultraviolet rays, only during those periods of time when the meat is at a temperature of 45° F. or below.

The prior art, as presently known to applicants, is devoid of any teaching which would lead one skilled in the art to arrive at and practice the unique method described in the subject application.

SUMMARY OF THE INVENTION

The invention is directed to a simple, yet highly effective, method of tenderizing meat, utilizing apparatus which may be used by the housewife, or utilizing apparatus for enabling the process to be practiced on a commercial scale.

The tenderization process does not utilize tenderizing agents or mold, by way of example, THAMNIDIUM, nor is the control of the temperature and humidity a critical factor. Ultraviolet rays are directed either directly or by reflection to all exposed surfaces of the meat, utilizing ultraviolet wave lengths which are greater than those which generate ozone and above those which have been characterized as carcinogenic by the F.D.A.

When used by a housewife a receptacle not much larger than a cake pan keeper is utilized for defining a chamber which contains one or more ultraviolet lamps which are under the control of a timer, the operation of which controls the "on" and "off" time of the ultraviolet lamps.

The enzymatic action of the natural enzymes within the meat is a continuous process which occurs before, during and after exposure of the meat to ultraviolet rays.

The invention likewise contemplates the tenderization of meat which has been wrapped within a film of the type which permits the substantially unimpaired passage of ultraviolet rays therethrough, wherein said rays will effectively kill, within a short period of time, most of the bacteria on the surface of the meat under the film wrap.

Meat has been successfully tenderized within a period of time between 14 and 24 hours, utilizing the process of the present invention, wherein tenderization has occurred without discoloration of the meat.

BRIEF DESCRIPTION OF THE DRAWINGS

FIG. 1 is an exploded perspective view of a receptacle such as may be utilized for enabling a housewife to practice the subject invention.

FIG. 2 is a top plan view of the receptacle of FIG. 1.

FIG. 3 is a side view of the device of FIG. 1 wherein the top and bottom portions of the device of FIG. 1 are disposed in closed, nested relationship.

FIG. 4 is a plan view of the right end of FIG. 3.

FIG. 5 is a diagram of an electrical circuit as utilized and embodied in the device of FIG. 1.

DESCRIPTION OF THE PREFERRED EMBODIMENTS

With particular reference to FIGS. 2, 3 and 4, the numeral 10 designates generally a two-part receptacle which includes an upper portion 12 and a lower portion 14 which, when disposed in the closed or nested position illustrated in FIGS. 2–4, define a closed compartment in which a meat-receptive rack 16 is housed. This rack may include a peripheral frame 18 having depending legs 20 which are adapted to engage the upper surface of the bottom wall 22 of lower portion 14. A suitable number of intersecting members 24 span the periphery 18 of the rack for providing a substantially open support for a meat product placed thereon.

The upper portion 12 includes a top wall 30, depending end walls 32, depending side walls 34, and preferably a handle 36 which is secured to and carried by top wall 30 for facilitating the separation and/or replacement of upper portion 12 to lower portion 14. The lower portion 14 includes upstanding side walls 40, upstanding end walls 42, and handles 44 which are secured to and carried by end walls 42, as illustrated.

The interior surface of the upper and lower portions 12 and 14, and the various surfaces of rack 16, are provided with a highly reflective finish whereby the ultraviolet rays generated by tubes T are effectively and efficiently directed to all surfaces of a piece of meat resting on rack 16.

Tubes T are suitably secured relative to the inner surface of top wall 30 by suitable brackets 50.

As illustrated in FIGS. 1 and 5, an electrical circuit to tubes T is obtained from a source of 110 volt alternating current from lines L1 and L2. Conductor 60 connects one side of a timer Q to line L1 whereas conductor 62 connects the other side of said timer to one side of ballast B. The other side of said ballast is connected via conductor 64 to line L2. Conductors 66 and 68 from ballast B terminate in electrical sockets 70 and 72 respectively which are adapted to receive pins 74 and 76 of conductors 78 and 80 which are connected in series with tubes T via conductor 82. An indicator lamp 84 is connected to conductors 78 and 80 by means of conductors 86 and 88, whereby said indicator lamp will be energized whenever tubes T are energized.

With particular reference now to FIGS. 1, 3 and 4, it will be noted that indicator lamp 84 is positioned on and externally of upper portion 12, preferably adjacent timer Q, whereby to indicate those periods of time when tubes T are operative and energized. Pins 74 and 76 depend from a suitable mounting member 75 which is secured to and carried by upper portion 12 adjacent end wall 32 whereby said pins must be inserted into complimentary sockets 72 and 70 as provided in the mounting block 71 which is secured to and carried by end wall 42 of lower portion 14 in order to complete an electrical circuit to the tubes T, when the timer is in a circuit-closing phase of its preset cycle. Ballast B may be secured to and carried by the undersurface of bottom wall 22 of the lower portion 14, as illustrated in FIGS. 1 and 3.

From the foregoing it will be noted that tubes T cannot be energized until and unless the upper portion 12 has been associated with and closed onto lower portion 14 whereby to define a completely closed chamber as illustrated in FIGS. 3 and 4, whereby to effectively prevent the ultraviolet rays from tubes T from injuring the eyes of a user of the device.

Timer Q is adapted to initially close an electrical circuit to tubes T and pilot lamp 84 for a predetermined, presettable period of time whereby ultraviolet light will be produced and impinge upon all surfaces of meat resting upon rack 16 within chamber 10 until such time as most of the bacteria on the surface of the meat have been killed. By our use of the expression "most of the bacteria are killed," we refer to a kill of from 51% to say 95% of the bacteria on the surfaces of the meat. At the end of the bacterial kill as aforesaid, tubes T are automatically deenergized via timer Q whereupon the meat is permitted to remain in a quiescent state while continuing to undergo the enzymatic action of the natural enzymes within the meat which continues to break down the connective tissue of the meat, but in the absence of ultraviolet light rays and for a period of time during which those surface bacteria which where not killed by the initial exposure to ultraviolet light will have multiplied and propagated to the approximate number of bacteria initially on the outer surface of the meat, when it was first introduced into the chamber 10. It is noted that while the natural enzymes within the meat are being permitted to continue to break down the connective tissue of the meat in the absence of ultraviolet rays on the outer surfaces of the meat, the temperature of the meat is not increased beyond the temperature which it attained during the aforementioned exposure to the ultraviolet rays.

After the bacteria count has been thus substantially propagated, tubes T are again energized via timer Q whereupon, without lowering the attained temperature of the meat, the meat is again subjected to ultraviolet rays for an additional period of time as determined by timer Q during which most of the surface bacteria on the now partially tenderized meat are killed after which the tubes are again deenergized, by the timer.

The above steps of subjecting the meat to ultraviolet rays, terminating the exposure of the meat to such ultraviolet rays, permitting the natural enzymes in the meat to continue to break down the connective tissue of the meat in the absence of ultraviolet rays and without increasing the temperature of the meat beyond the temperature which it attained during exposure to the ultraviolet rays, and resubjecting the meat to ultraviolet rays without lowering the attained temperature of the meat can be repeated until the meat has attained the desired degree of tenderization.

It should be understood that the wave lengths of the ultraviolet light rays which directly, or indirectly via reflection impinge on the outer surface of the meat on rack 16, are considerably above the ultraviolet wave lengths which generate ozone, preferably being in the range from 2650 to 2967 A°.

In practicing the subject invention, retail cuts, that is comparatively small quantities of meat are treated viz, several steaks, a primal or portion of a primal cut, or small roasts, in contrast to those tenderization processes which accommodate whole sides or quarters of an animal carcass.

Uniformly satisfactory results have been attained in those instances in which steaks, roasts, and other cuts of fresh meat in the one to twenty pound range have been effectively and efficiently tenderized by the subject process within 14 to 24 hours, without discoloration or darkening of the meat, without the formation of slime or other deleterious substances on the surface of the meat and wherein the flavor and tenderness of the meat have been materially enhanced.

We have found that when smaller pieces of meat, as aforesaid, are tenderized it is not necessary, or even desirable, to control the humidity within the treatment chamber since 100% humidity is automatically attained within the chamber without adversely effecting the meat.

By way of example, the interior dimensions of chamber 10 were about 13 inches long by 8 inches wide and 6 inches high, containing two quartz ultraviolet ray generating tubes T each about 11 inches long. In examples I-V 20-watt tubes spaced about four inches from the meat surfaces were utilized, whereas in examples VI and VII 5-watt tubes spaced about two inches from the meat surfaces were utilized.

In a commercial installation the inside dimensions of the chamber were about 3 feet by 2 feet by 4 feet, having from twelve to fifteen 12 inch long 20-watt quartz ultraviolet ray generating tubes on the three sides and top of the compartment.

In passing, it will be noted that our method and apparatus are equally efficient when tenderizing pieces of freshly cut unwrapped meat or pieces of freshly cut meat which have been wrapped in a film such as, by way of example, hydrolized ethylene vinyl acetate copolymer, which is known in the trade as EVA, having a mil thickness from ½ to 3 mils, said film being pervious or permeable to ultraviolet light in the 2650 to 2967 A° range. When pieces of raw meat are thus wrapped or encapsulated in a suitable film which is impervious to moisture and is permeable to ultraviolet rays of the above-noted Angstrom range, most of the aerobic and anaerobic bacteria on the surface of the wrapped meat, which is in contact with the inner surface of the film wrap, are effectively killed when subjected to ultraviolet light within a closed chamber within a period of from 3 to 60 minutes, but in any event before the color of the meat changes. The film wrap not only effectively produces a condition of 100% relative humidity within the wrap, it also prevents recurring bacterial infection of the meat from external surfaces.

It will be noted that the chamber or vessel in which the meat is housed is devoid of any means for increasing the temperature of the meat beyond the temperature attained during exposure to the ultraviolet rays, and it is likewise devoid of any means for cooling or reducing the temperature of the meat in the housing.

The following examples are illustrated of the flexibility of our process:

EXAMPLE I

Several pieces of freshly cut beef averaging 1×2×6 inches were placed on rack 16 and housed within the closed chamber after which the meat was subjected to ultraviolet light rays in the 2650 to 2967 A° range for a period of one hour wherein the attained temperature of the meat was 70° plus or minus 3° F. At the end of one hour the ultraviolet light was discontinued for a period of 22 hours, at which time the meat at the then attained temperature was again subjected to ultraviolet light rays for one hour, after which the meat was removed from the chamber and placed in a household refrigerator. The color of the meat when removed at the end of the 24 hour tenderization process was substantially indistinguishable from the color of the meat as initially placed on rack 16; however, the flavor and tenderness thereof was immeasurably enhanced.

EXAMPLE II

Several pieces of meat measuring approximately 1"×2"×6" were wrapped and completely sealed within a film of EVA ½ mil thick, after which said wrapped meat products were placed on rack 16 and housed within the closed chamber after which the meat was then subjected to ultraviolet light for a period of one hour during which time the meat attained a temperature of 70° plus or minus 3° F. At the end of one hour the ultraviolet light was discontinued for 22 hours at which time the meat at its then attained temperature was again subjected to ultraviolet light for an additional one hour, at which time it was removed from the chamber and placed in a domestic refrigerator. The color, texture, tenderness and taste of the packaged meat was indistinguishable from that of the unwrapped meat referred to in Example 1.

EXAMPLE III

Several pieces of meat measuring 1"×2"×6" were placed on rack 16 and housed within the closed chamber and then subjected to ultraviolet rays for a period of 20 minutes during which the meat attained a temperature of 70° plus or minus 3° F. At the end of 20 minutes the ultraviolet rays were discontinued for a period of 7 hours after which the meat, at its then attained temperature, was again subjected to ultraviolet light for an additional 20 minutes after which the light was again discontinued for an additional 7 hours, after which time the meat was again subjected to ultraviolet light for a final 20 minute period after which the meat was removed from the chamber. The texture, tenderness and taste of the treated meat was immeasurably enhanced and the color was substantially the same as at the start of the process.

EXAMPLE IV

Several pieces of meat measuring 1"×2"×6" were placed on a rack and housed within a closed chamber after which the meat was subjected to ultraviolet rays for a period of one hour at the end of which time the ultraviolet rays were discontinued for a period of 11 hours, at the end of which the time the meat was again subjected to ultraviolet light for a one hour period, after which it was permitted to remain on the rack within the container for an additional 11 hours, at the end of which time it was removed from the chamber. The color, tenderness and flavor of the treated meat was superior.

EXAMPLE V

Several pieces of beef, wrapped as in Example II, and measuring 1"×2"×6" were placed on rack 16 and housed within a chamber after which the meat was subjected to ultraviolet light within the closed chamber for a period of 20 minutes during which time the meat attained a temperature of from 70° to 80° F. At the end of 20 minutes the ultraviolet rays were discontinued for 7 hours, after which the meat was again irradiated for 20 minutes during which time the temperature of the meat within the chamber attained a temperature between 80° and 90° F. At the end of 20 minutes the irradiation was discontinued for a period of 7 hours, after which the meat was again irradiated for an additional 20 minutes and then removed from the chamber. The texture and flavor of the meat obtained from Example V equaled that of the preceding four examples; however, by reason of the higher temperatures to which the meat was subjected while in the chamber, the appearance of the meat as removed from the chamber was somewhat, but not objectionally, darker than the meat as originally placed on rack 16.

EXAMPLE VI

Several pieces of fresh unwrapped meat and several other pieces of fresh meat wrapped in 0.5 mil hydrolized ethylene vinyl acetate copolymer which was impervious to moisture but substantially pervious to ultraviolet rays in the 2600–3000 A° range, weighing up to 20 pounds, were housed within a closed chamber after which all of the exposed surfaces thereof were subjected to ultraviolet rays for a period of five minutes at the end of which time said rays were discontinued and the meat maintained in the chamber at the temperature which it attained during its said exposure to ultraviolet rays for six hours at the end of which time and without lowering the then attained temperature of the meat, the outer surfaces thereof were resubjected to ultraviolet rays for five minutes. The aforesaid cycles of nonexposure and exposure to ultraviolet rays were repeated for a total of 4 times after which the meat was finally subjected to ultraviolet rays for five minutes before being removed from the chamber. The tenderness and flavor of the meat were excellent and the color was of a slightly darker red shade than at the start of the test.

EXAMPLE VII

Pieces of fresh meat measuring 1"×2"×6" and other pieces of fresh meat weighing up to 20 pounds, some of each of which were wrapped and others of which were unwrapped as in the foregoing example, were housed within a closed chamber after which the external surfaces of all of the meat pieces were subjected to ultraviolet rays for a period of 3 minutes after which the meat, without increasing the temperature beyond that attained during exposure to the ultraviolet rays, was thereafter maintained in the chamber in the absence of ultraviolet rays for a period of 4 hours. The said exposure and nonexposure cycles to ultraviolet rays were repeated 6 times, and at the end of the last nonexposure cycle the products were subjected to ultraviolet rays while still housed within the closed chamber prior to removal therefrom, after which they were placed in a refrigerator. The resultant products were tender, good tasting, highly acceptable, free of any objectionable odor, and of an excellent, pleasing, redish purple color.

The numerous tests which we have conducted on larger, primal cuts of fresh beef, both wrapped and unwrapped, measuring up to 6"×8"×20" in the "commercial" chamber, heretofore referred to, have conclusively established that the subject process does not shrink the meat being tenderized nor does the outer surface thereof dry.

Contrary to the teachings of the prior art, highly desirable results are attained by subjecting the surface of unwrapped or wrapped meat to the direct and/or reflective ultraviolet rays in the 2650 to 2967 A° range. Our process likewise differs from the teachings of the prior art in that we subject the wrapped or unwrapped meat to ultraviolet radiation for a limited period of time even when the meat has attained temperatures of from 60° to 90° F.

It should, of course, be understood that enzymatic action within the meat occurs continuously, that is, before, during, and after the tenderization process, and not only during those periods of time when the meat is being subjected to ultraviolet radiation, but also during those periods of time when the irradiation has been discontinued. It should also be noted that we do not induce a flow of air, sterilized or otherwise, through the chamber in which the meat being tenderized is housed; nor do we utilize certain strains of mold bacteria such as, by way of example, THAMNIDIUM in order to induce and/or enhance the tenderization process; nor do we continuously irradiate the meat during tenderization; nor do we irradiate the meat only after its temperature has been reduced to 45° F. or below; nor do we increase the temperature of the meat at the end of each exposure to ultraviolet rays above the temperature which the meat attained during and by reason of its exposure to the ultraviolet rays.

The inherent and distinguishing feature of our process over the prior art resides in the manner in which the meat is initially subjected to ultraviolet rays for a comparatively short period of time, that is, until most of the bacteria on the surface of the meat have been killed, and wherein the period of exposure of the meat to the ultraviolet rays is discontinued before any color change appears in the meat, the surface of which is being irradiated. Enzymatic action occurs during the irradiation period, as well as those periods of time after generation of the ultraviolet rays has been terminated. Then, after the bacteria which remained on the surface of the meat after the initial exposure to ultraviolet rays have reproduced and multiplied to or to substantially more than their original number, the surface of the meat is again subjected to ultraviolet rays for again killing most of the surface bacteria.

The invention further contemplates the pasteurization of the outer surface of fresh meat cuts, such as retail cuts, and in particular the pasteurization of the outer surface of fresh meat cuts which have been encapsulated within a film of plastic of the type that is impervious to moisture and is substantially pervious to the passage of ultraviolet rays in the 2600–3000 A° range, to-wit: hydrolized ethylene vinyl acetate copolymer from ½ to 3 mils thick.

The wrapped or unwrapped meat products are pasteurized by subjecting them, in particular, the outer surfaces thereof, to a single exposure of ultraviolet rays, in particular, in the range of 2650 A° to 2967 A°, as aforesaid, of such intensity as to effectively and efficiently kill from 90% to 97% of the bacteria on the surface of the meat within one to five minutes. The shortness of exposure is such as to preclude a color change of, or an undesirable heating up, of the meat product.

The inherent advantages of our foregoing pasteurization process will be more fully appreciated when it is understood that meat products so treated have at least one more day of shelf life than similar pieces of meat not so treated, and that one extra day of shelf lift results in a 33⅓% savings to the butcher.

Prior to our pasteurization process it has been the custom for butchers to cut and then vacuum-pack primal and subprimal cuts of fresh meat in film after which it is chilled and sent to market for resale to the consuming public. The bacteria on the surface of the meat beneath the film would multiply, even though the meat was refrigerated, thereby limiting to three or at the most four days during which the meat could be sold for full price. By pasteurizing the meat, as aforesaid, the surface bacteria are substantially eliminated thereby increasing by at least one day the shelf life of the meat for resale at full price.

The meat, when being pasteurized as aforesaid, need not be housed within a closed chamber, but may be subjected to intense ultraviolet irradiation while suitably supported in a room such as, by way of example, on a conveyor which moves relative to the ultraviolet lamps.

Uniformly satisfactory results have been obtained in those instances in which the ultraviolet lamps are disposed within 2–8 inches of the meat products being tenderized or pasteurized.

In FIGS. 1–3 the ultraviolet lamps T are disposed above the rack 16 in upper portion 12 of the chamber; however, it should be understood that one or more lamps T could be mounted in the upper portion 12, the lower portion 14, or in both the upper and lower portions 12 and 14 for providing the desired irradiation of the outer surfaces of the meat.

We claim:

1. A method of tenderizing retail cuts of unwrapped fresh meat or fresh meat encapsulated within a film which is impervious to moisture and pervious to ultraviolet rays in the 2600–3000 A° range which comprises the steps of:
   (a) placing the meat within a closed chamber;
   (b) subjecting the outer surfaces of the meat to ultraviolet rays of such intensity that from 55% to 95% of the bacteria on the surfaces of the meat are killed within 60 minutes;
   (c) then terminating exposure of the surface of the meat to said ultraviolet rays before a color change occurs in the outer surfaces thereof;
   (d) permitting the natural enzymes within the meat to continue to break down the connective tissue thereof in the absence of ultraviolet rays on the outer surfaces of the meat while maintaining the temperature of the meat at a level which does not exceed the temperature while it attained during exposure to the ultraviolet rays;
   (e) resubjecting the outer surfaces of the meat to ultraviolet rays while the meat is at a temperature naturally attained from step (d) to kill most of the surface bacteria that are reproduced thereon during step (d) from the surface bacteria remaining after step (b), without lowering the temperature of the meat; and
   (f) repeating steps (b), (c), (d) and (e) until the meat has attained the desired degree of tenderization.

2. A method as called for in claim 1, wherein step (c) is terminated before the outer surface of the meat attains a temperature of 90° F. incident to exposure to the ultraviolet rays.

3. A method as called for in claim 1, wherein the outer surfaces of the tenderized meat are subjected to ultraviolet rays just prior to its removal from the chamber.

4. A method as called for in claim 1, wherein step (e) is initiated whenever the bacterial count on the outer surfaces of the meat approximates the original bacterial count when the meat was introduced into the chamber.

5. A method as called for in claim 1, wherein step (d) occurs over a period of from 7 to 22 hours.

6. A method as called for in claim 1, wherein the internal temperature of the meat during step (d) is from 62° to 90° F.

7. A method as called for in claim 1, wherein the meat in step (a) will have substantially all of its outer surfaces exposed to the direct or reflected ultraviolet rays during steps (b) and (e), and wherein the meat attains the desired degree of tenderization in from 14 to 24 hours.

8. A method of tenderizing retail cuts of fresh, wrapped meat, which comprises the steps of:
   (a) wrapping the meat in a moisture-impervious film which is substantially pervious to ultraviolet rays in the 2600 to 3000 A° range;
   (b) placing the wrapped meat within a closed chamber;
   (c) subjecting the outer surfaces of said meat to ultraviolet rays until from 55% to 95% of the aerobic and anaerobic bacteria of the surface of the meat adjacent the film have been killed;
   (d) terminating exposure of the wrapped meat to said ultraviolet rays before a color change occurs in the outer surfaces of the meat;
   (e) permitting the natural enzymes within the meat to continue to break down the connective tissue thereof in the absence of ultraviolet rays while maintaining the temperature of the meat at a level which does not exceed the temperature attained during its exposure to the ultraviolet rays;

resubjecting the outer surfaces of the meat to ultraviolet rays while the meat is at a temperature naturally obtained from step (e) to kill most of the surface bacteria that are reproduced thereon during step (e) from surface bacteria remaining after step (c), without lowering the temperature of the meat; and (g) repeating steps (c), (d), (e) and (f) until the wrapped meat has attained the desired degree of tenderization.

9. A method as called for in claim 8, wherein step (f) is practiced at least once, and whenever the anaerobic bacteria remaining on the meat surfaces after step (c) have reproduced to approach the count of said bacteria on the surfaces of the meat as in step (a).

10. A method as called for in claim 8, wherein the film comprises hydrolized ethylene vinyl acetate copolymer.

11. The method as called for in claim 10, wherein the thickness of the film is from 0.5 to 3.0 mils.

* * * * *